United States Patent
Masai

(10) Patent No.: US 6,363,230 B1
(45) Date of Patent: Mar. 26, 2002

(54) COPYING MACHINE HAVING TANDEM FUNCTION

(75) Inventor: Katsunori Masai, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 09/709,566

(22) Filed: Nov. 13, 2000

(30) Foreign Application Priority Data

Dec. 6, 1999 (JP) ............................................. 11-346536

(51) Int. Cl.[7] ............................................... G03G 15/00
(52) U.S. Cl. ............................................. 399/82; 399/8
(58) Field of Search ........................... 399/82, 8, 9, 16, 399/76, 81; 358/1.15

(56) References Cited

U.S. PATENT DOCUMENTS 5,809,363 A * 9/1998 Kitamura et al. ............... 399/8
6,192,202 B1 * 2/2001 Doi ................................ 399/8

* cited by examiner

Primary Examiner—Sophia S. Chen
(74) Attorney, Agent, or Firm—Smith, Gambrell & Russell, LLP

(57) ABSTRACT

A copying machine to which a cooperative copying machine is connectable by a cable and which can perform a tandem function for distributing a job to the cooperative copying machine and causing the cooperative copying machine to execute the job. The copying machine includes a function selection input accepting circuit for accepting only function selection input relating to a common function provided in both the copying machine and the cooperative copying machine when a tandem mode is set, and a function setting circuit for setting the copying machine in order to perform the function accepted by the function selection input accepting circuit.

13 Claims, 5 Drawing Sheets

FIG. 3

| COPYING FUNCTION | COPYING MACHINE 10 | COPYING MACHINE 20 |
|---|---|---|
| A4 CASSETTE | O | O |
| A3 CASSETTE | O | O |
| B4 CASSETTE | O | X |
| B5 CASSETTE | O | X |
| A2 CASSETTE | X | X |
| DUPLEX | X | O |
| DIVIDE | O | O |
| SORT | O | O |
| GROUP | O | O |
| PUNCH | O | X |
| STAPLE 1 | O | O |
| STAPLE 2 | O | X |
| PAPER FOLDING | X | O |
| REVESAL PAPER DISCHARGE | O | X |

COPYING MACHINE HAVING TANDEM FUNCTION

BACKGROUND OF THE INVENTION

1. Field of the Invention

The present invention relates to a copying machine to which one or a plurality of copying machines are connectable by a dedicated cable and which has a tandem function for distributing image data read by one of the copying machines among the plurality of copying machines and causing the copying machines to perform copying processing.

2. Description of Related Art

A copying machine to which one or a plurality of copying machines are connectable by a dedicated cable and which has a tandem function for distributing image data read by one of the copying machines among the plurality of copying machines and causing the copying machines to perform copying processing to improve productivity has already been developed. In doing copying utilizing the tandem function, however, no attention has been paid to circumstances where mode setting is performed for utilizing a function which is available in only parts of the plurality of copying machines. In order to utilize the tandem function, therefore, it has been necessary that all of the plurality of copying machines connected to one another have the same functions.

When only one of the two copying machines connected to each other by a cable has a stapling function, for example, the tandem function cannot be utilized. Even if both the copying machines respectively have duplex copying functions, for example, the tandem function cannot be utilized when the duplex copying function of one of the copying machines is at fault.

SUMMARY OF THE INVENTION

An object of the present invention is to provide a copying machine capable of utilizing, even when the functions of a plurality of copying machines connected to one another by a cable are not the same, a tandem function in the range of the function common to the plurality of copying machines.

Another object of the present invention is to provide a copying machine capable of causing, when the functions of a plurality of copying machines connected to one another by a cable are not the same, only parts of the copying machines to execute jobs in response to the selection of the functions provided in the parts of the copying machines.

A copying machine according to a first aspect of the present invention is a copying machine to which a cooperative copying machine can be connected by a cable and which can perform a tandem function for distributing a job to the cooperative copying machine and causing the cooperative copying machine to execute the job. The copying machine comprises a mode setting section for setting the copying machine to a tandem mode for performing the tandem function; a common function judging circuit for judging, when the tandem mode is set, a common function provided in both the copying machine and the cooperative copying machine; a function selection input accepting circuit for accepting only function selection input relating to the common function judged by the common function judging circuit and bringing selection input of a noncommon function which is not provided in either the copying machine or the cooperative copying machine into an acceptance inhibited state; and a function setting circuit for setting the copying machine in order to perform the function accepted by the function selection input accepting circuit.

By this construction, when the functions of the plurality of copying machines connected to one another by a cable are not the same, the copying machines can be caused to perform copying processing in the tandem mode only with respect to the function common to all the copying machines.

A copying machine according to a second aspect of the present invention is a copying machine to which one or a plurality of cooperative copying machines can be connected by a cable and which can perform a tandem function for distributing a job to the cooperative copying machines and causing the cooperative copying machines to execute the job. The copying machine comprises a function selection instruction issuing section for issuing an instruction to select the function; a job start instruction issuing section for starting the execution of the job corresponding to the function selected by the function selection instruction issuing section; a function judging circuit for judging whether or not the function selected by the function selection instruction issuing section can be performed by any of the copying machine and the cooperative copying machines; a function setting circuit for setting a specified copying machine which the function judging circuit judges can perform the function in order to execute the job corresponding to the function; and a job control circuit for causing the specified copying machine to perform the function set by the function setting circuit upon issuing the instruction to start the jobs by the job start instruction issuing section.

By this construction, in a case where the functions of the plurality of copying machines connected to one another by the cable are not the same, when the functions provided in only parts of the copying machines are selected, copying processing can be performed only by the parts of the copying machines.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing an example of a function comparison table; and

DESCRIPTION OF PREFERRED EMBODIMENTS

Figure 1:
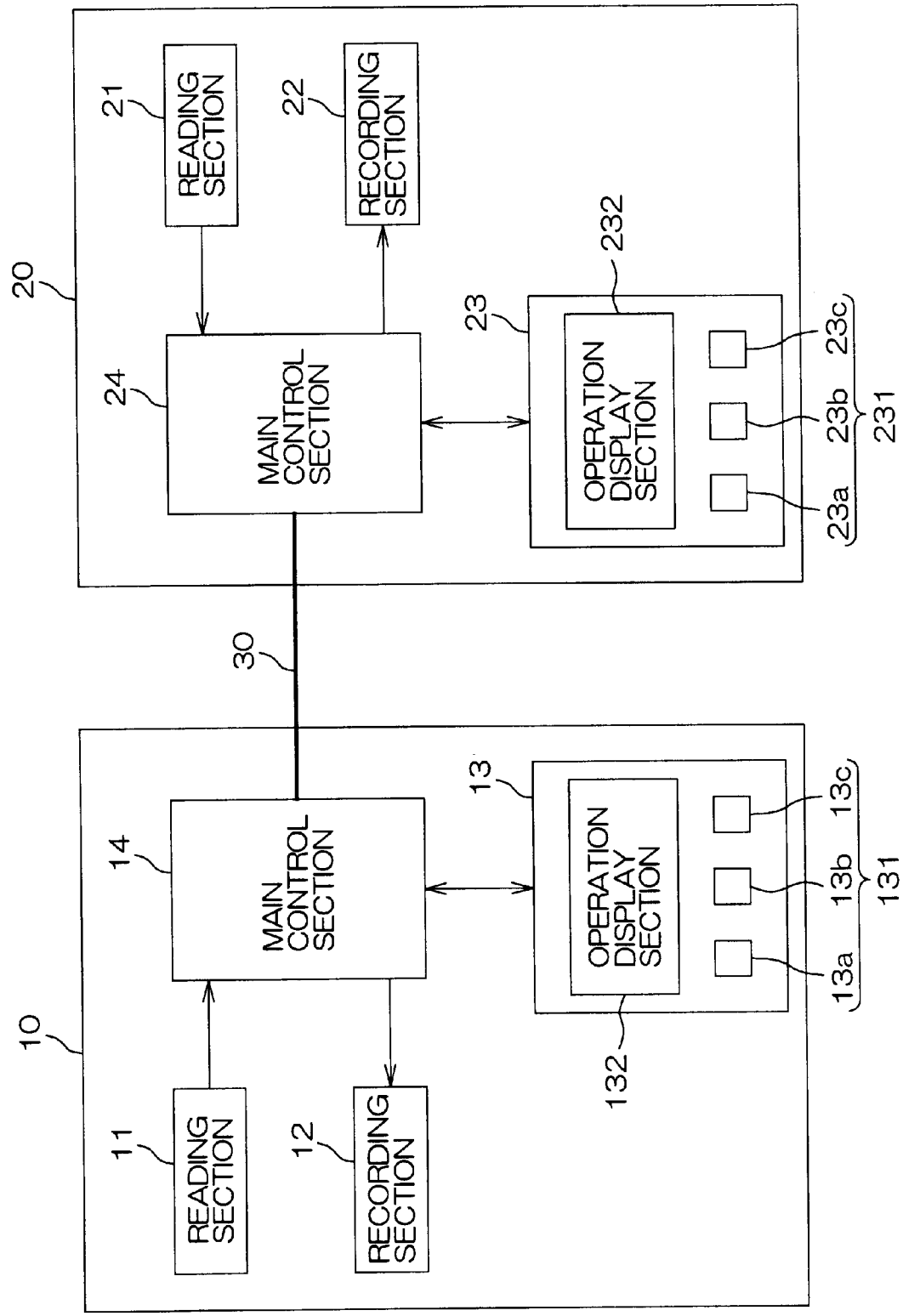
FIG. 1 is a block diagram showing the schematic configuration of two copying machines connected to each other in order to utilize a tandem function.

FIG. 1 is a block diagram showing the electrical configuration of two copying machines connected to each other in order to utilize a tandem function. Two copying machines 10 and 20 respectively comprise reading sections 11 and 21 for optically reading a document image and converting the read document image into an image signal, recording sections 12 and 22 for recording the read image signal on paper sheets, operation display sections 13 and 23 respectively having display devices 132 and 232 and operation keys 131 and 231, and main control sections 14 and 24 for controlling the sections.

The operation keys 131 and 231 in the operation display sections 13 and 23 respectively comprise tandem mode setting keys 13a and 23a for setting the copying machines 10 and 20 to a tandem mode, function selecting keys 13b and 23b for selecting one or a plurality of functions (for example, a stapling function, a duplex copying function, etc.) in causing the copying machines 10 and 20 to perform a copying operation, and start keys 13c and 23c for starting copying processing by the selected functions. The operation key 131 may be composed of a mechanical switch arranged around the display device 132 composed of a liquid crystal panel, for example, or may be constructed by a combination of a button displayed on the display device 132 and a transparent touch panel provided on a surface of the display device.

The respective main control sections 14 and 24 in the copying machines 10 and 20 are connected to each other by a dedicated cable 30.

A first embodiment will be first described. In the first embodiment, in a case where the functions of the two copying machines 10 and 20 connected to each other by the cable are not the same, a tandem function can be utilized in the range of the function common to the copying machines 10 and 20. In this case, it is assumed that the copying machine 20, for example, is a cooperative copying machine for performing copying processing in cooperation with the copying machine 10.

Specifically, a document image is read by the copying machine 10, a user sets, for example, a copying mode with respect to the copying machine 10, and copying processing is performed upon being distributed between the copying machine 10 and the cooperative copying machine 20.

Figure 2:
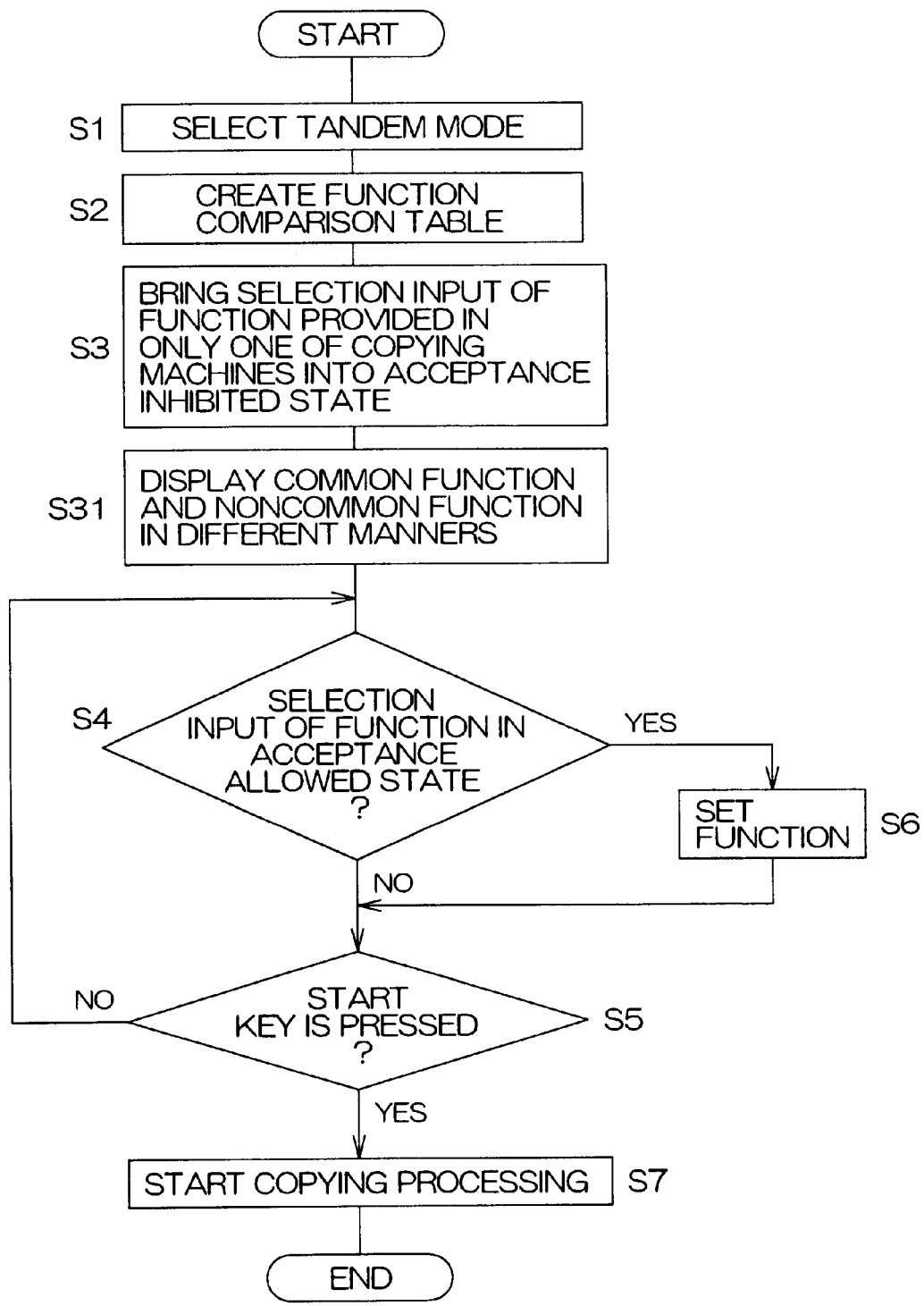
FIG. 2 is a flow chart showing an example of the process procedure performed by a main control section in the copying machine in a case where a tandem mode is selected.

FIG. 2 is a flow chart showing the process procedure performed by the main control section 14 in the copying machine 10 in a case the tandem mode setting key 13a is operated to select the tandem mode.

When the tandem mode is set by the tandem mode setting key 13a (step S1), the main control section 14 creates a function comparison table, as shown in FIG. 3, on a memory in order to compare the functions of the copying machine 10 and the cooperative copying machine 20 (step S2).

In the function comparison table shown in FIG. 3, a function which can be utilized is represented by a symbol "○" and a function which cannot be utilized is represented by "X". For example, on the memory, a value "1" is assigned to the symbol "○", and a value "0" is assigned to the symbol "X".

The main control section 14 refers to the function comparison table, to compare the functions of both the copying machines 10 and 20, and specifies the common function which can be utilized in both the copying machines 10 and 20. That is, if the logical AND of the values, in the function comparison table, corresponding to a function of the copying machines 10 and 20 is "1", then the function is a common function. The function in which the logical AND is "0" is a noncommon function which can be utilized only by either of the copying machines or can be utilized in neither of the copying machines.

The main control section 14 brings, with respect to the function provided only in either of the copying machines or the function provided in neither of the copying machines (the noncommon function in which the logical AND is "0"), selection input of the function into an acceptance inhibited state (step S3). The main control section 14 controls the operation display section 13, to indicate on the display device 132 that the tandem mode is selected, and inverts, flashes, or cancels the display of the function which cannot be selected (the noncommon function). That is, the common function and the noncommon function are displayed in different manners on the operation display section 13 (step S31).

Thereafter, when an input operation for selecting the common function (a copying function) which is in the acceptance allowed state is performed by the function selecting key 13b (step S4), the main control section 14 sets the sections in each of the copying machines 10 and 20 in order to perform the selected common function (step S6). In this case, the sections in the cooperative copying machine 20 are set by the main control section 24 which has received a command from the main control section 14 through the dedicated cable 30. When the plurality of functions are to be set, a function selecting operation (step S4) and a corresponding function setting operation (step S6) are repeatedly performed.

When the start key 13c in the operation display section 13 is pressed (step S5), copying processing is performed upon being distributed between the copying machines 10 and 20 (step S7). A copying mode in this case is a copying mode corresponding to the function set at the step S6. Copied paper sheets are discharged from both the copying machines 10 and 20 by the copying mode.

Figure 4A:
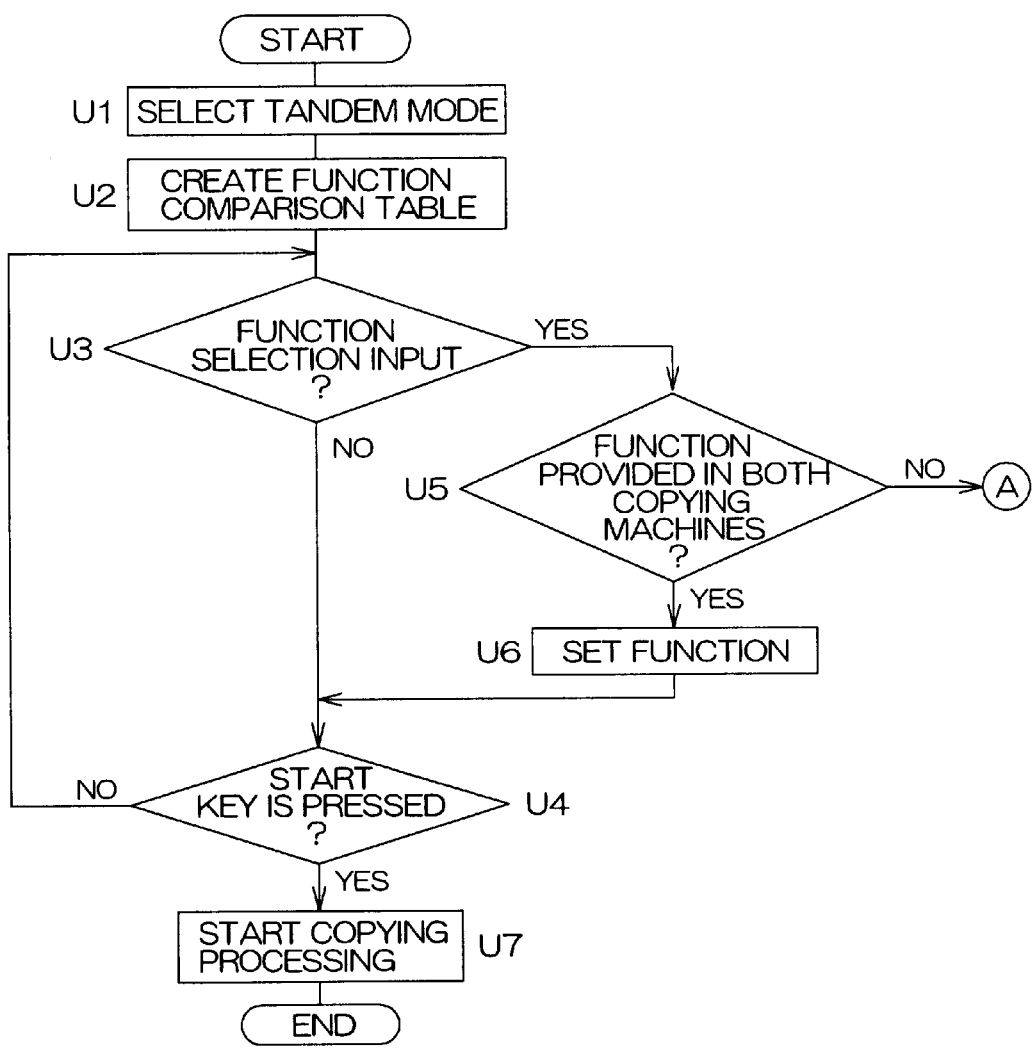
FIGS. 4A and 4B show a flow chart showing another example of the process procedure performed by a main control section in the copying machine in a case where a tandem mode is selected.
Figure 4B:
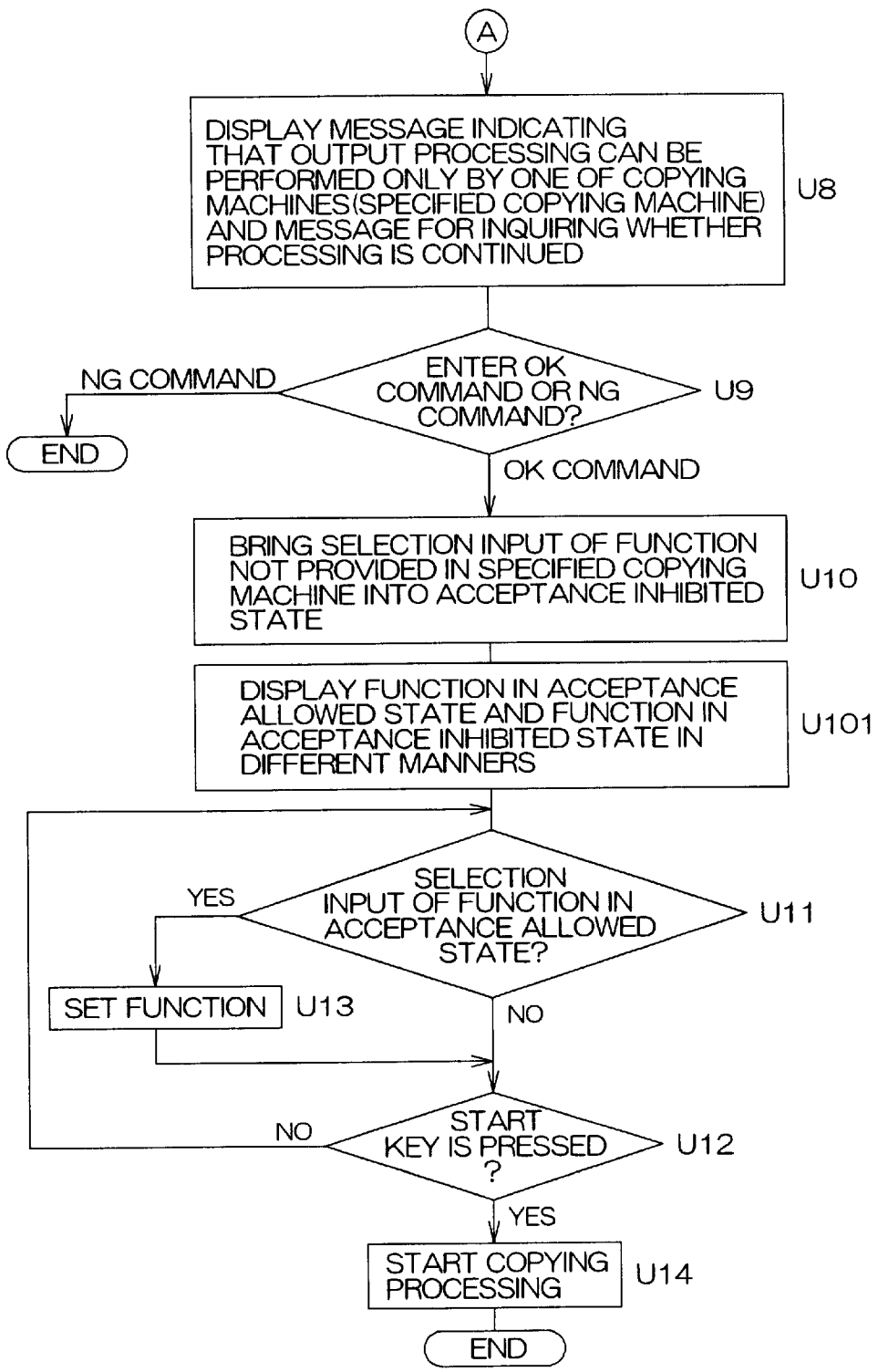

FIGS. 4A and 4B show a flow chart for explaining the operation of a copying machine according to a second embodiment of the present invention. In the description of the second embodiment, FIGS. 1 and 3, together with FIGS. 4A and 4B, will be referred to.

In the second embodiment, in a case where the functions of two copying machines 10 and 20 connected to each other are not the same, when a function (a noncommon function) provided in one of the copying machines is selected, copying processing by the function can be performed by only one of the copying machines. Description is made of a case where a document image is read by the one copying machine 10, for example, and a copying mode is set by a user with respect to the copying machine 10.

FIGS. 4A and 4B show the process procedure performed by a main control section 14 in the copying machine 10 in a case where a tandem mode for performing a tandem function is selected.

When a tandem mode setting key 13a in an operation display section 13 is operated to select the tandem ode (step U1), the main control section 14 creates a function comparison table, as shown in FIG. 3, on a memory in order to compare the functions of the copying machine 10 and the other copying machine 20 (a cooperative copying machine) (step U2).

The main control section 14 further judges whether or not a copying function is selected (a copying mode is selected) by the user operating a function selecting key 13b, and judges whether or not a start key 13c in the operation display section 13 is pressed (step U4). When the copying function is selected by the user (step U3), it is judged whether or not the selected copying function is a copying function (a common function) provided in both the copying machines 10 and 20 (step U5). When the selected copying function is a function common to both the copying machines 10 and 20, the sections in the copying machine 10 are set in order to set the selected copying function. A command issued to perform setting for performing the common function is transmitted to a main control section 24 in the copying machine 20 through a cable 30. Thereafter, the program proceeds to the step U4.

When the start key 13c is pressed after only the copying function provided in both the copying machines 10 and 20 is selected (YES at step U4), jobs are distributed between both the copying machines 10 and 20, so that copying processing is started (step U7). A copying mode at this time is a copying mode corresponding to the function set at the step U6.

When it is judged at the step U5 that the selected copying function is a copying function (a non-copying function) provided in only one of the copying machines 10 and 20, the copying machine having the selected copying function is specified. The specified copying machine is hereinafter referred to as a "specified copying machine". In this case, the main control section 14 displays on a display device 132 in the operation display section 13 a message indicating that output processing can be performed only by the specified copying machine, that is, copying processing in the tandem mode cannot be performed in a system of the two copying machines which are currently presumed. Further, the main control section 14 displays on the display device 132 in the operation display section 13 a message for inquiring whether or not the processing is continued (step U8).

The message forces the user to enter a command to continue processing (an OK command) or a command to stop processing (an NG command) When the NG command is entered (NG at step U9), the tandem mode is stopped.

On the other hand, when the OK command is entered, the main control section 14 brings, with respect to the function which is not provided in the specified copying machine out of the functions of both the copying machines 10 and 20, selection input of the function into an acceptance inhibited state (step U10). In other words, the selection input of only the function provided in the specified copying machine enters an acceptance allowed state. At this time, the main control section 14 controls the operation display section 13, to display the function in the acceptance allowed state and the function in the acceptance inhibited state on the display device 132 in different manners (step U101).

Thereafter, when an operation for selecting the function in the acceptance allowed state is performed by the function selecting key 13b (step U11), the sections in the copying machine 10 are set in correspondence with the selected copying function (step U13). When the start key 13c in the operation display section 13 is operated in this state (step U12), the copying processing by the specified copying machine is started (step U14). A copying mode at this time is a copying mode corresponding to one or more functions set at the steps U6 and U13 if only the function provided in both the copying machines 10 and 20 is selected. When a function other than the function provided in both the copying machines 10 and 20 is selected, the copying mode is a copying mode corresponding to the function set at the step U13. At this time, it is preferable to indicate on the display device 132 in the operation display section 13 that the copying processing is not performed in the tandem mode and which of the copying machines is the specified copying machine.

Although description has been made of the embodiments of the present invention, the present invention can be embodied in another embodiment. For example, although in the first and second embodiments, description has been made of a case where the copying processing in the tandem function is performed by the two copying machines, the present invention is also applicable to a case where the copying processing in the tandem function is performed by three or more copying machines.

The three or more copying machines may be connected by connecting the two or more copying machines to the copying machine 10 through cables, for example. The two or more copying machines may be connected to the copying machine 10 by connecting the copying machine 10 and the copying machine 20 to each other by the dedicated cable 30 as well as connecting the other copying machine to the copying machine 20 by a cable.

When the second embodiment is applied to a system in which three or more copying machines are connected in tandem, a case where the two more copying machines are "specified copying machines" may occur. In this case, it is preferable that jobs are executed upon being distributed among the two ore more specified copying machines. That is, an image may be read in the one specified copying machine, and copying processing of the read image may be performed upon being distributed among the plurality of specified copying machines.

Although the present invention has been described and illustrated in detail, it is clearly understood that the same is by way of illustration and example only and is not to be taken by way of limitation, the spirit and scope of the present invention being limited only by the terms of the appended claims.

The application is based on Japanese Patent Application Serial No. 11-346536 filed with the Japanese Patent Office on Dec. 6, 1999, the disclosure of which is incorporated by reference.

What is claimed is:

1. A copying machine to which a cooperative copying machine is connectable by a cable and which can perform a tandem function for distributing a job to the cooperative copying machine and causing the cooperative copying machine to execute the job, comprising:

a mode setting section for setting the copying machine to a tandem mode for performing the tandem function;

a common function judging circuit for judging, when the tandem mode is set, a common function provided in both the copying machine and the cooperative copying machine;

a function selection input accepting circuit for accepting only function selection input relating to the common function judged by the common function judging circuit and bringing selection input of a noncommon function not provided in either the copying machine or the cooperative copying machine into an acceptance inhibited state; and a function setting circuit for setting the copying machine in order to perform the function accepted by the function selection input accepting circuit.

2. The copying machine according to claim 1, wherein the common function judging circuit includes a function comparison table creating circuit for creating a function comparison table for comparing the functions of the copying machine and the cooperative copying machine, and the function selection input accepting circuit brings the selection input of the noncommon function not provided in either the copying machine or the cooperative copying machine into an acceptance inhibited state on the basis of the function comparison table created by the function comparison table creating circuit.

3. The copying machine according to claim 1, further comprising a display section for displaying the common function and the noncommon function in different manners.

4. The copying machine according to claim 1, further comprising:
   a job start instruction issuing section for starting the execution of the job, and
   a job control circuit for distributing the function set by the function setting circuit between the copying machine and the cooperative copying machine and causing the copying machine and the cooperative copying machine to execute the job upon issuing an instruction to start the job by the job start instruction issuing section.

5. The copy machine according to claim 1, wherein
   the copying machine is a copying machine to which a plurality of cooperative copying machines can be connected by a cable, and
   the common function judging circuit judges the common function provided in the copying machine and all of the cooperative copying machines connected to the copying machine by the cable.

6. The copying machine according to claim 1, wherein
   when the tandem function is set, copying processing of an image read by the copying machine is performed upon being distributed between the copying machine and the cooperative copying machine.

7. A copying machine to which one or a plurality of cooperative copying machines are connectable by a cable and which can perform a tandem function for distributing a job to the cooperative copying machines and causing the cooperative copying machines to execute the job, comprising:
   a function selection instruction issuing section for issuing an instruction to select the function;
   a job start instruction issuing section for starting the execution of the job corresponding to the function selected by the function selection instruction issuing section;
   a function judging circuit for judging whether or not the function selected by the function selection instruction issuing section can be performed by any of the copying machine and the cooperative copying machines;
   a function setting circuit for setting a specified copying machine, which is judged to be capable of performing the function, in order to execute the job corresponding to the function; and
   a job control circuit for causing the specified copying machine to perform the function set by the function setting circuit upon issuing the instruction to start the job by the job start instruction issuing section.

8. The copying machine according to claim 7, wherein
   the job control circuit distributes, when there are a plurality of specified copying machines, the job among the plurality of specified copying machines and causes the specified copying machines to execute the job.

9. The copying machine according to claim 8, wherein
   copying processing of an image read by one of the plurality of specified copying machines is performed upon being distributed among the plurality of specified copying machines.

10. The copying machine according to claim 7, wherein
    the specified copying machine further includes a display section for displaying, when it includes only a part out of the copying machine and the cooperative copying machines, a message indicating that the job cannot be executed upon being distributed among the copying machine and all the cooperative copying machines.

11. The copying machine according to claim 7, further comprising
    a circuit for bringing selection input of a function which is not provided in the specified copying machine into an acceptance inhibited state.

12. The copying machine according to claim 11, further comprising
    a display device for displaying the function in the acceptance inhibited state and a function in an acceptance allowed state in different manners.

13. The copying machine according to claim 7, wherein
    the function judging circuit includes a function comparison table creating circuit for creating a function comparison table for comparing the functions of the copying machine and the cooperative copying machines, and
    the function setting circuit sets the copying machine capable of performing the function selected by the function selection instruction issuing section in order to execute the job corresponding to the function on the basis of the function comparison table created by the function comparison table creating circuit.

\* \* \* \* \*